United States Patent
Jansson (10) Patent No.: US 11,927,486 B2
(45) Date of Patent: Mar. 12, 2024

(54) MONITORING OF PARTICLE TEMPERATURE TRENDS

(71) Applicant: Firefly AB, Stockholm (SE)

(72) Inventor: Lennart Jansson, Värmdö (SE)

(73) Assignee: Firefly AB, Stockholm (SE)

(*) Notice: Subject to any disclaimer, the term of this patent is extended or adjusted under 35 U.S.C. 154(b) by 854 days.

(21) Appl. No.: 16/971,578

(22) PCT Filed: Jan. 21, 2019

(86) PCT No.: PCT/EP2019/051378
§ 371 (c)(1),
(2) Date: Aug. 20, 2020

(87) PCT Pub. No.: WO2019/162011
PCT Pub. Date: Aug. 29, 2019

(65) Prior Publication Data
US 2020/0386622 A1    Dec. 10, 2020

(30) Foreign Application Priority Data

Feb. 23, 2018 (SE) .................... 1850207-0

(51) Int. Cl.
*G01J 5/00* (2022.01)
*A62C 3/04* (2006.01)
*G08B 17/12* (2006.01)

(52) U.S. Cl.
CPC .............. *G01J 5/0022* (2013.01); *A62C 3/04* (2013.01); *G08B 17/12* (2013.01)

(58) Field of Classification Search
CPC ........ G01J 5/0066; G01J 5/602; G01J 5/0014; G01J 5/0022; G08B 17/12; A62C 3/04
See application file for complete search history.

(56) References Cited

U.S. PATENT DOCUMENTS 3,824,392 A    7/1974  Tibbling
4,142,417 A    3/1979  Cashdollar et al.
(Continued)

FOREIGN PATENT DOCUMENTS

CN    101490554 A        7/2009
CN    107204093 A    *   9/2017
(Continued)

*Primary Examiner* — Brandi N Hopkins
*Assistant Examiner* — Janice M Soto
(74) *Attorney, Agent, or Firm* — Faegre Drinker Biddle & Reath LLP (57) ABSTRACT

A system for monitoring of temperature trends for particles moving along a path of movement from a first position to a second position includes a sensor arrangement and processing device. The sensor arrangement includes at least two sensing elements detecting radiation emitted from the particles, arranged to co-operate with mutually separated sensing zones along the path of movement of the particles to detect a signal related to the temperature of particles. The processing device is arranged to: receive signals from the sensor arrangement; form signals from the at least one set of sensing elements into at least one pulse train when a particle moves through the field-of-view of the sensor arrangement; and based on this at least one pulse train monitor changes over time in the temperature of particles moving through the field-of-view of the sensor arrangement by monitoring changes over time in the wavelength distribution of the radiation emitted from the particles.

22 Claims, 6 Drawing Sheets

(56) References Cited

U.S. PATENT DOCUMENTS

| | | | |
|---|---|---|---|
| 5,740,867 A | 4/1998 | Jansson | |
| 5,749,420 A | 5/1998 | Jansson | |
| 6,732,810 B1* | 5/2004 | Jansson | G01J 5/602 340/584 |
| 2009/0203154 A1 | 8/2009 | Carter et al. | |
| 2012/0194800 A1 | 8/2012 | Debreczeny | |
| 2017/0147884 A1* | 5/2017 | Lorenzoni | G01J 5/0018 |

FOREIGN PATENT DOCUMENTS

| | | |
|---|---|---|
| WO | WO-87/03210 A1 | 6/1987 |
| WO | WO-00/39769 A1 | 7/2000 |
| WO | WO-2008/118260 A2 | 10/2008 |

\* cited by examiner

EXPLOSION CHARACTERISTICS OF VARIOUS DUSTS

| TYPE OF DUST | EXPLOSI-BILITY INDEX | IGNITION SENSI-TIVITY | EXPLO-SION SEVERITY | MAXIMUM EXPLOSION PRESSURE Bar* | MAX RATE OF PRESSURE RISE Bar/sec* | IGNITION TEMPERATURE CLOUD °C | IGNITION TEMPERATURE LAYER °C | MIN CLOUD IGNITION ENERGY, J | MIN EXPLOSION CONC GRAM/m³ |
|---|---|---|---|---|---|---|---|---|---|
| CELLULOSE | 2.8 | 1.0 | 2.8 | 8.96 | 310 | 480 | 270 | 0.080 | 55 |
| CELLULOSE, ALPHA | >10 | 2.7 | 4.0 | 8.07 | 552 | 410 | 300 | 0.040 | 45 |
| COCOA, NATURAL 19% FAT | 0.6 | 0.5 | 1.1 | 4.69 | 83 | 510 | 240 | 0.10 | 75 |
| COFFE, FULLY ROASTED | <0.1 | 0.2 | 0.1 | 2.62 | 10 | 720 | 270 | 0.16 | 85 |
| CORN | 6.9 | 2.3 | 3.0 | 7.79 | 414 | 400 | 250 | 0.04 | 55 |
| CORNSTARCH COMMERCIAL PRODUCT | 9.5 | 2.8 | 3.4 | 7.31 | 517 | 400 | - | 0.04 | 45 |
| CORK DUST | >10 | 3.6 | 3.3 | 6.62 | 517 | 460 | 210 | 0.035 | 35 |
| COTTON LINTER, RAW | <0.1 | <0.1 | <0.1 | 5.03 | 28 | 520 | - | 1.92 | 501 |
| CUBE ROOT, SOUTH AMERICAN | 6.5 | 2.7 | 2.4 | 4.76 | 145 | 470 | 230 | 0.04 | 40 |
| GRAIN DUST, WINTER WHEAT, CORN, OATS | 9.2 | 2.8 | 3.3 | 9.03 | 483 | 430 | 230 | 0.03 | 55 |
| LYCOPODIUM | 16.4 | 4.2 | 3.9 | 5.17 | 214 | 480 | 310 | 0.04 | 25 |
| MILK, SKIMMED | 1.4 | 1.6 | 0.9 | 6.55 | 159 | 490 | 200 | 0.05 | 50 |
| RICE | 0.3 | 0.5 | 0.5 | 4.09 | 48 | 510 | 450 | 0.10 | 85 |
| SOY FLOUR | 0.7 | 0.6 | 1.1 | 6.48 | 55 | 550 | 340 | 0.10 | 60 |
| SUGAR, POWDERED | 9.6 | 4.0 | 2.4 | 7.52 | 345 | 370 | 400 | 0.03 | 45 |
| WHEAT FLOUR | 4.1 | 1.5 | 2.7 | 6.69 | 193 | 440 | 440 | 0.06 | 50 |
| WHEAT STARCH, EDIBLE | 17.7 | 5.2 | 3.4 | 6.90 | 448 | 430 | - | 0.025 | 45 |
| WOOD FLOUR, WHITE PINE | 9.9 | 3.1 | 3.2 | 7.79 | 379 | 470 | 260 | 0.040 | 35 |

Compiled from the following reports of the U.S. Department of Interior, Bureau of Mines: RI 5753, The Explosibility of Agricultural Dusts; RI 6516, Explosibility of Metal Powders; RI 5971, Explosibility of Dusts used in the Plastics Industry; RI 6597, Explosibility of Carbonaceous Dusts; RI 7132, Dust Explosibility of Chemicals, Drugs, Dyes and Pesticides; and RI 7208, Explosibility of Miscellaneous Dusts.

MONITORING OF PARTICLE TEMPERATURE TRENDS

TECHNICAL FIELD

The present disclosure relates generally to systems and methods for monitoring of temperature trends for particles moving along a path of movement from a first position to a second position.

BACKGROUND

Masses of particles may be moved around in different types of production facilities, such as e.g. process plants, e.g. in connection with the pneumatic transport of particles. The material is often loosely formed and transported by a gas or in a gas or gaseous mixture, such as air, in which the material particles are mutually discrete. The material particles may e.g. be extremely fine, dust-like particles, powdery material, granular particles, wood chips, pellets or straw. The process plants may e.g. be recycling plants, sawmills, or different types of production plants, for e.g. various types of food, diapers, pulp or paper. Particles may before or during such transport become so heated that they will form hot particles, glowing embers or sparks, which may initiate fire or explosion in a risk zone. If burning or glowing particles can be detected, the risk area can be isolated, or firefighting or choking means can be supplied, prior to the initiation of a fire or explosion.

U.S. Pat. No. 3,824,392 describes a transducer that may be used to detect burning or glowing particles in connection with the transport of particles. The transducer has at least two mutually separated sensing zones, in which light-sensitive sensing elements co-operating with each zone receive light during the movement of a light-emitting particle, such as a spark or a fire flake, through the field-of-view of the transducer. The signal sent from the transducer when a light-emitting particle passes the transducer will thus be in the form of a pulse train. This eliminates false alarms due to light changes caused by e.g. the switching on of lamps. When a burning or glowing particle is detected, the process may be interrupted, or fire eliminating means may be supplied.

U.S. Pat. No. 5,740,867 describes a preventive safety system which can be applied in a process in which loosely formed material is produced in a first unit and transported, through an indicating zone and an extinguishing zone, to a second unit. If a hazardous high-temperature particle is detected in the indicating zone, an extinguishing agent may e.g. be delivered in the extinguishing zone.

U.S. Pat. No. 5,749,420 describes a preventive safety system which can be applied in a process in which loosely formed material is produced in a first unit and transported to a second unit, and in which the sensed intensity is used to calculate the liability of a particle to initiate fire and/or explosion.

Problems with the Prior Art

The risk level in a system transporting particles depends on both the temperature and the energy content of the particles. Prior art systems determine this risk level by measuring the signal strength for a detector that captures heat generated radiation. The signal strength for such a detector depends on both the temperature and the energy content of the particle. In prior art systems, this signal strength is compared to a threshold, giving the general output "high risk" or "low risk", based on whether the signal strength is above or below the threshold.

However, different types of particles have different ignition temperatures and ignition energies. If the temperature is far below the ignition temperature for the specific particle, the risk is low even if the energy content would be very high.

There is thus a need for an improved particle heat detection system.

SUMMARY

The above described problem is addressed by the claimed system for monitoring of temperature trends for particles moving along a path of movement from a first position to a second position. The system may comprise a sensor arrangement, a field-of-view of which is arranged in the path of movement of the particles to detect a signal related to the temperature of particles moving through said field-of-view. The sensor arrangement may comprise at least one set of sensing elements detecting radiation emitted from the particles, each set comprising at least two sensing elements arranged to co-operate with mutually separated sensing zones along the path of movement of the particles. The system may further comprise at least one processing device, which is arranged to: receive signals from the sensor arrangement; form signals from the at least one set of sensing elements into at least one pulse train when a particle moves through the field-of-view of the sensor arrangement; and based on this at least one pulse train monitor changes over time in the temperature of particles moving through the field-of-view of the sensor arrangement by monitoring changes over time in the wavelength distribution of the radiation emitted from the particles. Such a system allows for an accurate monitoring of temperature trends for particles moving along a path of movement from a first position to a second position.

The above described problem is further addressed by the claimed method for monitoring of temperature trends for particles moving along a path of movement from a first position to a second position. The method may comprise: detecting a signal related to the temperature of particles moving through a field-of-view of a sensor arrangement, said field-of-view being arranged in the path of movement of the particles, the sensor arrangement comprising at least one set of sensing elements detecting radiation emitted from the particles, each set comprising at least two sensing elements arranged to co-operate with mutually separated sensing zones along the path of movement of the particles; forming the signals from the at least one set of sensing elements into at least one pulse train when a particle moves through the field-of-view of the sensor arrangement; and monitoring changes over time in the temperature of particles moving through the field-of-view of the sensor arrangement based on this at least one pulse train by monitoring changes over time in the wavelength distribution of the radiation emitted from the particles. Such a method allows for an accurate monitoring of temperature trends for particles moving along a path of movement from a first position to a second position.

In embodiments, the sensor arrangement comprises first and second sets of sensing elements, wherein the first set of sensing elements detects radiation of wavelengths within a first wavelength range, and the second set of sensing elements detects radiation of wavelengths within a second wavelength range, wherein the second wavelength range differs from the first wavelength range. A relation between the signal strengths of the signals detected by the first and second sets of sensing elements may be determined, and based on this relation changes over time in the wavelength distribution of the radiation emitted from the particles may be monitored. This is an easy way of accurately monitoring temperature trends for particles moving along a path of movement from a first position to a second position.

In embodiments, the first and second sensing elements are arranged in first and second sensors, which first and second sensors are arranged beside each other and/or in parallel along the path of movement of the particles. This is a straight-forward way of creating a sensor arrangement.

In embodiments, sensing elements from more than one set of sensing elements are arranged to co-operate with the same sensing zone. There may e.g. be one sensing element from each set of sensing elements co-operating with each sensing zone.

In embodiments, the sensor arrangement comprises first and second wavelength filter arrangements, wherein the first wavelength filter arrangement causes the sensor arrangement to detect radiation of wavelengths within a first wavelength range, and the second wavelength filter arrangement causes the sensor arrangement to detect radiation of wavelengths within a second wavelength range, wherein the second wavelength range differs from the first wavelength range. A relation between the signal strengths of the signals detected by the sensor arrangement through the first and second wavelength filter arrangements may be determined, and based on this relation changes over time in the wavelength distribution of the radiation emitted from the particles may be monitored. This is another easy way of accurately monitoring temperature trends for particles moving along a path of movement from a first position to a second position.

In embodiments, the temperature of particles moving through the field-of-view of the sensor arrangement may be determined. It may also be determined how close the temperature of the particles moving through the field-of-view of the sensor arrangement is to the ignition temperature for the particle type of the particles moving along the path of movement from the first position to the second position.

In embodiments, the rate of change in the temperature of particles moving through the field-of-view of the sensor arrangement may be determined. This may e.g. be used to determine if the temperature increases rapidly.

In embodiments, it may be determined whether the temperature of the particles moving through the field-of-view of the sensor arrangement has changed more than a predetermined threshold amount. This may e.g. be used to set an alert or alarm in case of rapidly increasing temperatures.

In embodiments, information about temperature trends for the particles moving through the field-of-view of the sensor arrangement may be sent to at least one operator, and/or to a control system. This enables alerts or information type "alarms" to be sent in case of e.g. increasing temperatures, so that corrective action can be taken before the temperature of the particles has reached the level where the system generates a "real" alarm. The analysis of temperature trends also enables an optimization of the monitored process.

In embodiments, changes over time in the energy content of the particles moving through the field-of-view of the sensor arrangement are also monitored. If the temperature of the particles is close or to or above the ignition temperature for the specific type of particle, a rise in energy content may indicate imminent danger.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 is a table showing the explosion characteristics of dusts of different particle types.

Embodiments of the present disclosure and their advantages are best understood by referring to the detailed description that follows. It should be appreciated that like reference numerals are used to identify like elements illustrated in one or more of the figures.

DETAILED DESCRIPTION

Different types of particles have different ignition temperatures and ignition energies. FIG. 4 is a table showing the explosion characteristics of dusts of different particle types. The ignition temperature for powdered sugar in cloud form is 370° C., while the ignition temperature for fully roasted coffee in cloud form is 720° C. The ignition temperatures of rice in cloud form (510° C.) and cotton linter in cloud form (520° C.) are rather similar, while the ignition energies are quite different (0.1 J for rice and 1.92 J for cotton linter). The prior art way of determining the risk level based on the signal strength of a detector that generally captures heat generated radiation (which depends on both the temperature and the energy content of the particle) may thus either give false alarms for cotton linter or fail to warn when the temperature of rice becomes dangerously high, even though the ignition temperatures are the same. In order to determine the risk level in a system transporting a specific type of particle, it is thus advantageous to first determine the temperature of the particles. If the temperature is far below the ignition temperature, the risk is low even if the energy content would be very high. It is thus important to monitor the temperature of the particles.

This requires the use of a sensor arrangement that can detect temperature differences. One option is of course to use a regular temperature sensor. However, it is important that it is really the temperature of the moving particles that is determined. Since an easy way of differentiating radiation emitted from the moving particles from ambient radiation is to use a sensor arrangement comprising a set of at least two sensing elements arranged to co-operate with mutually separated sensing zones along the path of movement of the particles, as described in U.S. Pat. No. 3,824,392, a number of such sets of sensing elements, each set comprising sensing elements which detect radiation of wavelengths within a certain wavelength range, may be used to monitor the temperature of the particles. The relation between the signal strengths of signals detected by the sets of sensing elements will determine the temperature, since a body at a certain temperature emits radiation with a certain wavelength distribution, based on Planck's Law of Radiation.

Figure 5:
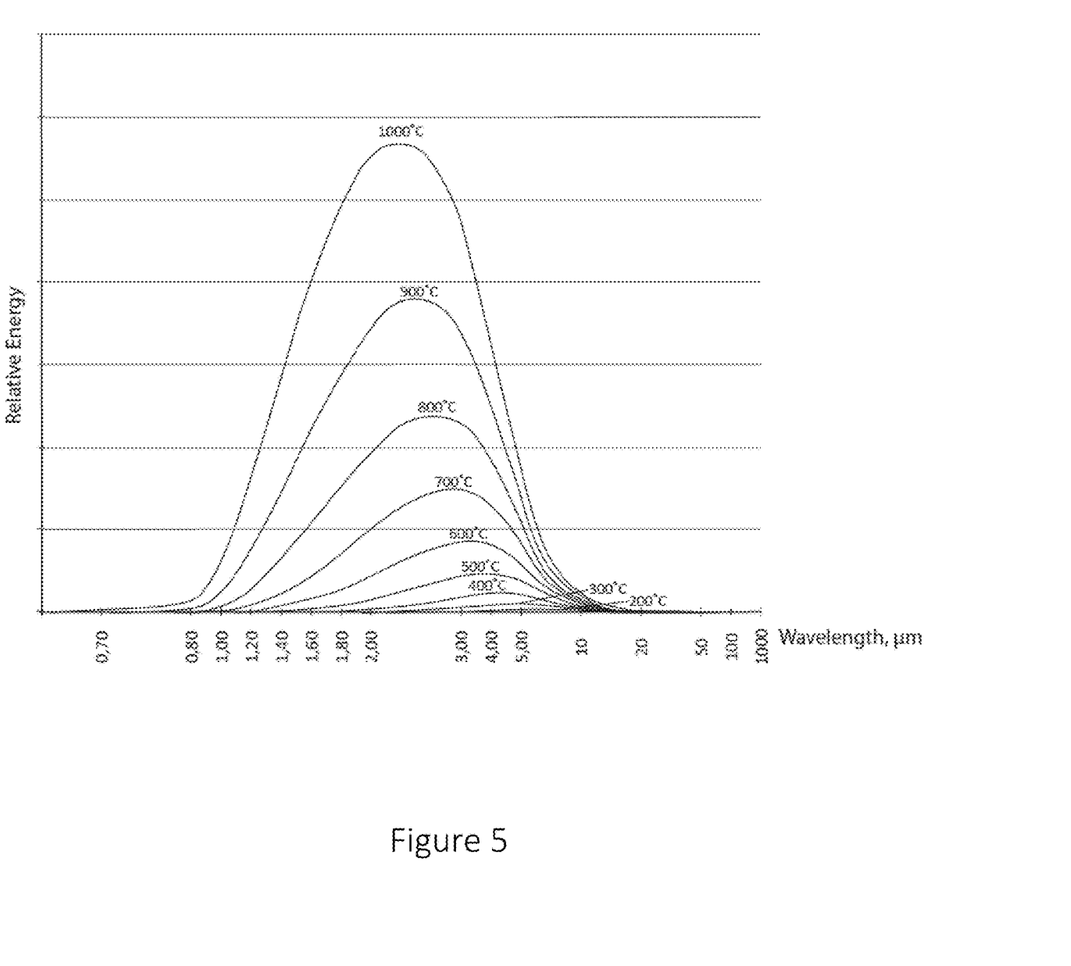
FIG. 5 illustrates the optical radiation over different temperatures for a suitable sensing element.

FIG. 5 illustrates the optical radiation over different temperatures for a typical particle. It can be seen in FIG. 5 that if the relation between the signal strengths from the different sets of sensing elements, each of which detect radiation of wavelengths within a certain wavelength range, is e.g. linear, with the signal strength increasing slightly at longer wavelengths, the temperature is relatively low. If instead the signal strength e.g. has a peak at a certain wavelength, and decreases at higher wavelengths, the temperature is high.

It may not be necessary to actually determine the temperature based on these relations, as long as the temperature trend can be monitored, by determining whether the relation between the signal strengths from the sensing elements changes over time. This may e.g. be done by determining if the relation changes from being approximately linear to having a peak at a certain wavelength.

Interesting trends may be both temperature trends and energy content trends. If the signal strength rises at all wavelengths, there is a general energy content increase in the particles. If the temperature of the particles is close to, or above, the ignition temperature for the specific type of particle, the rise in energy content may indicate imminent danger.

The analysis of temperature trends enables alerts or information type "alarms" to be sent to operators of the system, and/or to a control system, in case of e.g. increasing temperatures, so that corrective action can be taken before the temperature of the particles has reached the level where the system generates a "real" alarm. The analysis of temperature trends also enables an optimization of the monitored process.

The present disclosure relates generally to systems and methods for monitoring of temperature trends for particles moving along a path of movement from a first position to a second position. The movement of the particles along the path of movement from the first position to the second position may be effected in many different ways, such as using pneumatic transport (suction or blow), pressing, or simply letting the particles fall using gravity (if there is a vertical difference between the first position and the second position). Embodiments of the disclosed solution are presented in more detail in connection with the figures.

Figure 1:
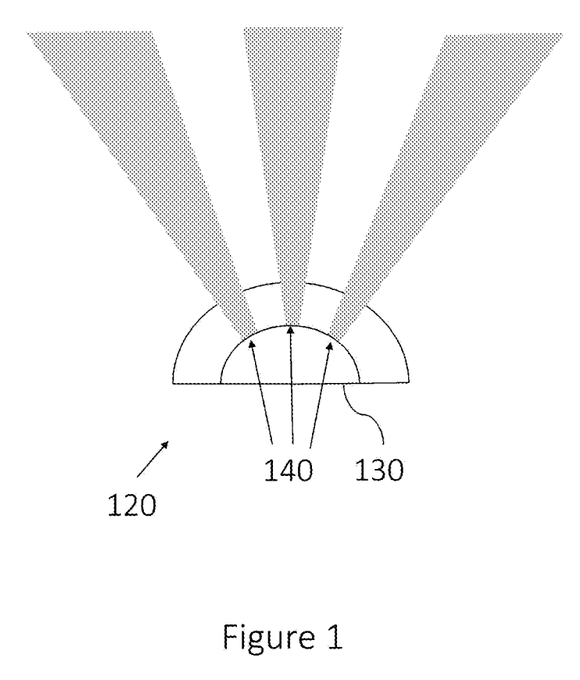
FIG. 1 schematically illustrates a sensor arrangement, in accordance with one or more embodiments described herein.

FIG. 1 schematically illustrates a sensor arrangement 120, in accordance with one or more embodiments described herein. The sensor arrangement 120 shown in FIG. 1 comprises three mutually separated sensing zones, and a set of three sensing elements 140 detecting radiation emitted from the particles 160, each arranged to co-operate with one of the sensing zones. There may also be further sets of sensing elements 140, each of which detecting radiation of wavelengths within a certain wavelength range, arranged to co-operate with the same sensing zones. For example, if there are three sets of sensing elements, there may be three sensing elements 140, one from each set of sensing elements, arranged to co-operate with each sensing zone.

Figure 2:
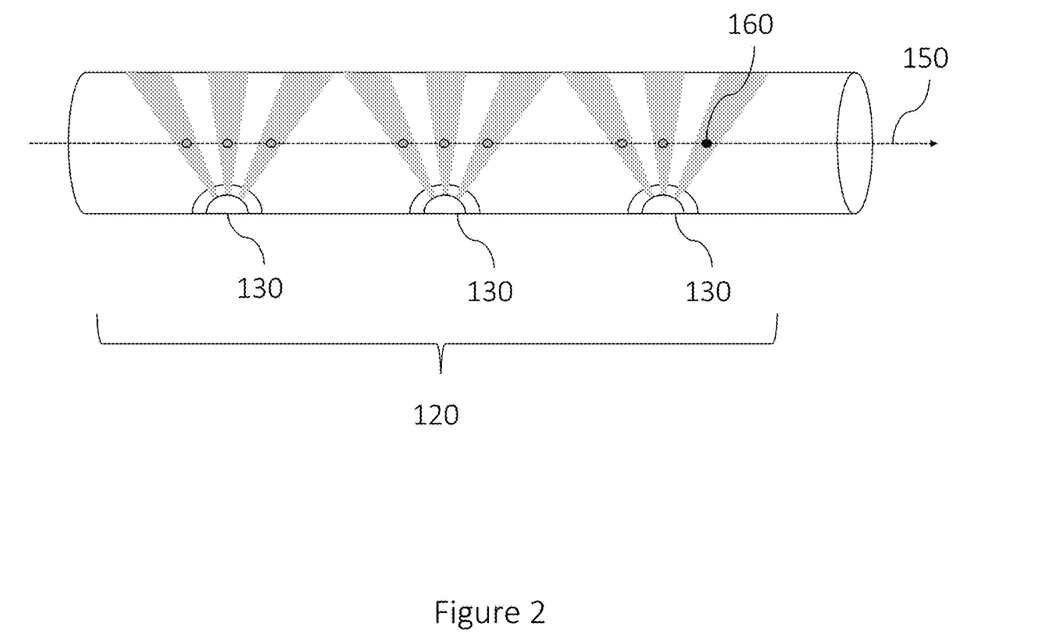
FIG. 2 schematically illustrates a sensor arrangement, in accordance with one or more embodiments described herein.

FIG. 2 schematically illustrates a sensor arrangement 120, in accordance with one or more embodiments described herein. Each set of sensing elements 140 in the sensor arrangement 120 may be arranged in a sensor 130, and the sensor arrangement 120 may comprise any number of sensors 130, each of which detecting radiation of wavelengths within a certain wavelength range. Each of the three sensors 130 shown in FIG. 2 comprises a set of three sensing elements 140, where the three sensing elements 140 of each set are arranged to co-operate with three mutually separated sensing zones along the path 150 of movement of the particles 160. The sensor arrangement 120 may be arranged to detect a signal related to the temperature of particles 160 moving in front of it and through its field-of-view, preferably with a sensing angle of up to 180 degrees. The at least one processing device 180 may be arranged to receive signals from each sensor 130 and form the signals from each set of sensing elements 140 into a pulse train.

Figure 3:
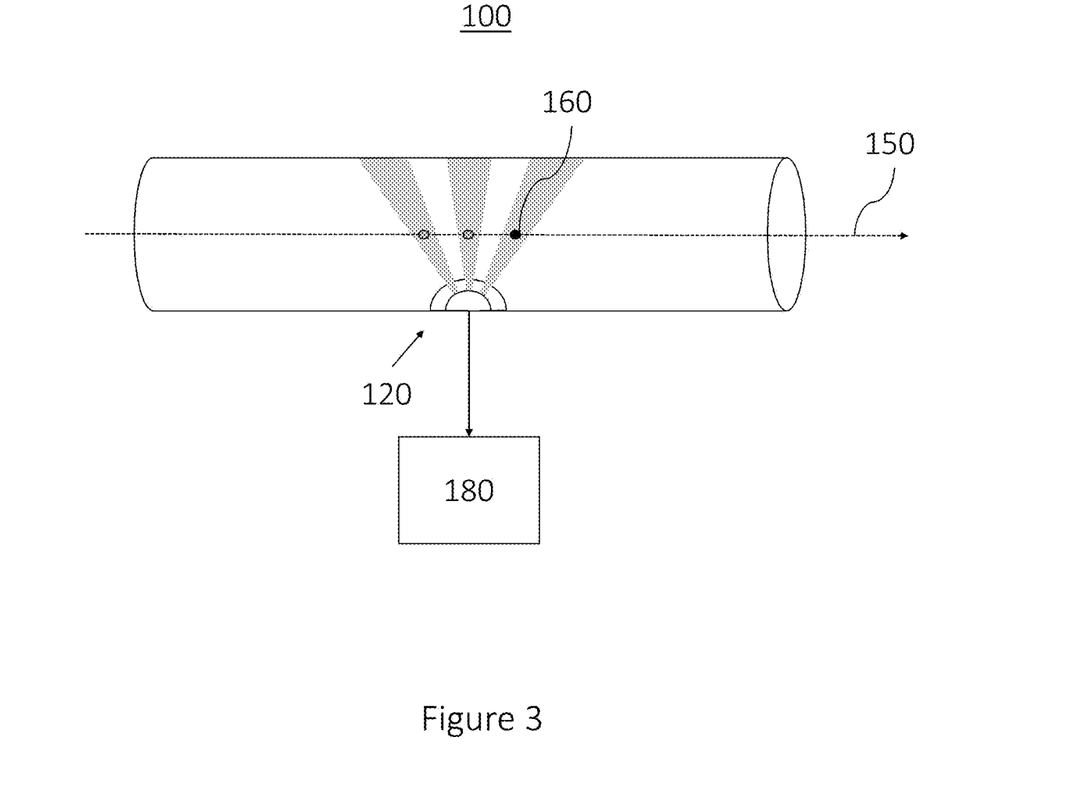
FIG. 3 schematically illustrates a system for monitoring of temperature trends for particles moving along a path of movement from a first position to a second position, in accordance with one or more embodiments described herein.

FIG. 3 schematically illustrates a system 100 for monitoring of temperature trends for particles 160 moving along a path 150 of movement from a first position to a second position, in accordance with one or more embodiments described herein. The system 100 comprises a sensor arrangement 120, a field-of-view of which is arranged in the path 150 of movement of particles 160 moving through said field-of-view, and at least one processing device 180. The sensor arrangement 120 may be arranged to detect a signal related to the temperature of particles 160 moving in front of it and through its field-of-view. The sensor arrangement 120 shown in FIG. 3 comprises at least one set of sensing elements 140, each set comprising three sensing elements 140 arranged to co-operate with three mutually separated sensing zones along the path 150 of movement of the particles 160.

The sensor arrangement 120 shown in FIGS. 1-3 is arranged in a path 150 of movement of the particles 160, but the sensor arrangement 120 may also, or alternatively, be arranged next to a path 150 of movement of the particles 160, as long as the field-of-view of the sensor arrangement 120 is arranged in a path 150 of movement of the particles 160. The path 150 of movement is in FIG. 1-3 shown as being horizontal, but it may have any orientation. If the particles 160 are intended to fall pass the sensor arrangement 120 using gravity, a vertical orientation may be preferred.

The sensing elements 140 are preferably sensing elements that have a clear temperature dependent response in a temperature range covering the ignition temperatures of the particles 160 moving along a path 150 of movement from a first position to a second position. Such sensing elements are e.g. lead sulphide cells, which are preferably used to detect radiation in wavelengths between 1 and 3 µm. As can be seen in FIG. 5, the shape of the temperature curve is significantly different for different temperatures in this wavelength range, in a temperature range covering the ignition temperatures of many common particles, as listed in the table of FIG. 4.

The at least one processing device 180 may be arranged to receive signals from the sensor arrangement 120 and form the signals from the at least one set of sensing elements 140 into at least one pulse train. Based on this at least one pulse train, the at least one processing device 180 may then monitor changes over time in the temperature of particles 160 moving through the field-of-view of the sensor arrangement 120, preferably by monitoring changes over time in the wavelength distribution of the radiation emitted from the particles 160. The at least one processing device 180 may further be arranged to determine a relation between the signal strengths of signals detected by different sets of sensing elements 140 or by the same sets of sensing elements 140 using different wavelength filters.

The sensor arrangement 120 shown in FIG. 1 comprises one sensor 130 comprising three mutually separated sensing zones along the path 150 of movement of the particles 160, and three sensing elements 140, each co-operating with one of the sensing zones.

An easy way of accurately monitoring of temperature trends for particles 160 moving along a path 150 of movement from a first position to a second position is to include several sets of sensing elements 140, each set comprising sensing elements 140 that detect radiation of wavelengths within a certain wavelength range, in the sensor arrangement 120. Such several sets of sensing elements 140 may be arranged in only one sensor 130, or in a number of different sensors 130. The radiation wavelengths that the sensing elements 140 are sensitive to may depend on e.g. the material of the sensing elements 140.

An alternative way of accurately monitoring of temperature trends for particles 160 moving along a path 150 of movement from a first position to a second position is to use several different wavelength filters, each wavelength filter causing the sensing elements 140 to detect radiation of wavelengths within a certain wavelength range, in the sensor arrangement 120.

The at least one processing device 180 may be arranged to determine a relation between the signal strengths of the signals detected by the different sets of sensing elements 140 or through the different wavelength filters, and based on this relation monitor changes over time in the temperature of particles 160 moving through the field-of-view of the sensor arrangement 120.

FIG. 2 shows three sets of sensing elements 140, each set arranged in a sensor 130. The three sensors 130 shown in FIG. 2 are arranged beside each other along the path 150 of movement of the particles 160, which means that a particle 160 will pass one sensor 130 after the other. In such an arrangement, the signals from the sensors 130, i.e. the sets of sensing elements 140, will be phase shifted in relation to each other. If only one particle 160 at a time passes the sensor arrangement 120, the signals from the sets of sensing elements 140 may e.g. be correlated based on the phase shift. However, if many particles 160 pass the sensor arrangement 120 simultaneously, the sensor arrangement 120 will output an average value for the particles 160. In such a case the exact phase shift may be less important.

In an alternative embodiment, the sensors 130 are instead arranged in parallel along the path 150 of movement of the particles 160, so that a particle 160 passes all sensors 130, i.e. all sets of sensing elements 140, simultaneously. Combinations are also possible, so that groups of sensing elements 140 arranged in parallel are arranged beside each other along the path 150 of movement of the particles 160. It is e.g. possible to arrange a number of different sensing elements 140 in each sensing zone, so that the sensor arrangement 120 comprises at least two mutually separated sensing zones, where in each sensing zone a number of different sensing elements 140, each of which detecting radiation of wavelengths within a certain wavelength range, are arranged. Sensing elements 140 from more than one set of sensing elements may thus be arranged to co-operate with the same sensing zone. There may e.g. be a sensing element 140 from each set of sensing elements co-operating with each sensing zone.

Instead of just monitoring changes over time in the temperature of particles 160 moving along a path 150 of movement from a first position to a second position, the temperature of the particles 160 moving through the field-of-view of the sensor arrangement 120 may also be determined. This enables at least one processing device 180 to determine how close the temperature of the particles 160 is to the ignition temperature for the particle type of the particles moving along the path 150 of movement from the first position to the second position, and thus enables a very accurate determination of the risk level. If the temperature of the particles 160 is far below the ignition temperature for the particle type of the particles moving along the path 150 of movement from the first position to the second position, the risk is low even if the energy content of the particles 160 would be very high, but if the temperature of the particles 160 is above the ignition temperature for the particle type of the particles moving along the path 150 of movement from the first position to the second position, even relatively low energy content may become dangerous.

The type of a particle 160 is a way of describing different inherent aspects of the particle. The particle type depends on the material of the particle 160, but also on e.g. the size of the particle 160. Wood chips are e.g. considered to belong to a different particle type than sawdust, even though the wood chips may come from the same type of wood as the sawdust. Also various treatments to the particles 160 way affect the particle type. Fully roasted coffee is e.g. considered as a different particle type than plain coffee beans. Various coverings on the particles 160 may affect both the ignition temperature and the ignition energy.

In some situations, not all particles 160 are of the same particle type. During the transport of one particle type along a path 150 of movement from a first position to a second position, other particle types may also be transported, usually in the form of pollutions or contaminations. For example, hot metal flakes may have been sheared from process equipment during a process stage before the transport of the particles 160. Since it is especially the risk that such metal flakes ignite the surrounding particles 160 that needs to be avoided, the temperature of the metal flakes should be compared with the ignition temperature of the surrounding particles, not with the ignition temperature of the metal in question.

The at least one processing device 180 may be arranged to determine the rate of change in the temperature of particles 160 moving through the field-of-view of the sensor arrangement 120. Slow temperature changes may e.g. be caused by overloads in the monitored process. This does not necessarily increase the risk of a fire or explosion, but the information about such overloads may e.g. be used to optimize the monitored process.

If the rate of change in the temperature of particles 160 moving through the field-of-view of the sensor arrangement 120 is above a predetermined threshold, the rate of change may be determined to be fast. This may e.g. be caused by pollutions or contaminations in the system, and thus alarms should preferably be sent in such situations.

Information about temperature trends of particles 160 moving through the field-of-view of the sensor arrangement 120 may thus be sent to at least one operator, and/or to a control system. This information may e.g. be sent as alarms, information type "alarms", alerts, instructions to set flags in the control system, or plain data. The average temperature of the particles 160 moving through the field-of-view of the sensor arrangement 120 may fluctuate, e.g. depending on the type of processing the particles 160 have been subjected to, or the amount of particles 160. A certain fluctuation may be normal, and therefore it may be desirable to adapt the temperature threshold to the average temperature of the particles 160, provided that this stays within a predefined acceptable level of fluctuation. If the fluctuation is greater than the predefined acceptable level of fluctuation, information may be sent to the at least one operator, and/or to the control system.

The predefined acceptable level of fluctuation may e.g. depend on the type of processing the particles 160 have been subjected to. For example, when monitoring a processing plant for the making of particle boards, the monitoring of the average temperature of the sawdust particles may reveal information about the process of sawing the particle boards. The average temperature of the sawdust particles will increase as soon as the saw starts sawing trough the particle board, but in a normal situation return to the average temperature before the sawing, once the particle board has been sawed through. If the average temperature instead increases over time, for each sawing through the particle board, this may e.g. be an indication that the extraction of sawdust from the saw is not working properly, e.g. due to the pipe being clogged. If the average temperature increases during the sawing through the particle board, this may e.g. be an indication that the saw blade is becoming blunt. Information about how the average temperature of the particles 160 fluctuates may therefore be used to optimize the process, by e.g. exchanging saw blades when the monitoring reveals that they are becoming blunt.

Figure 6:
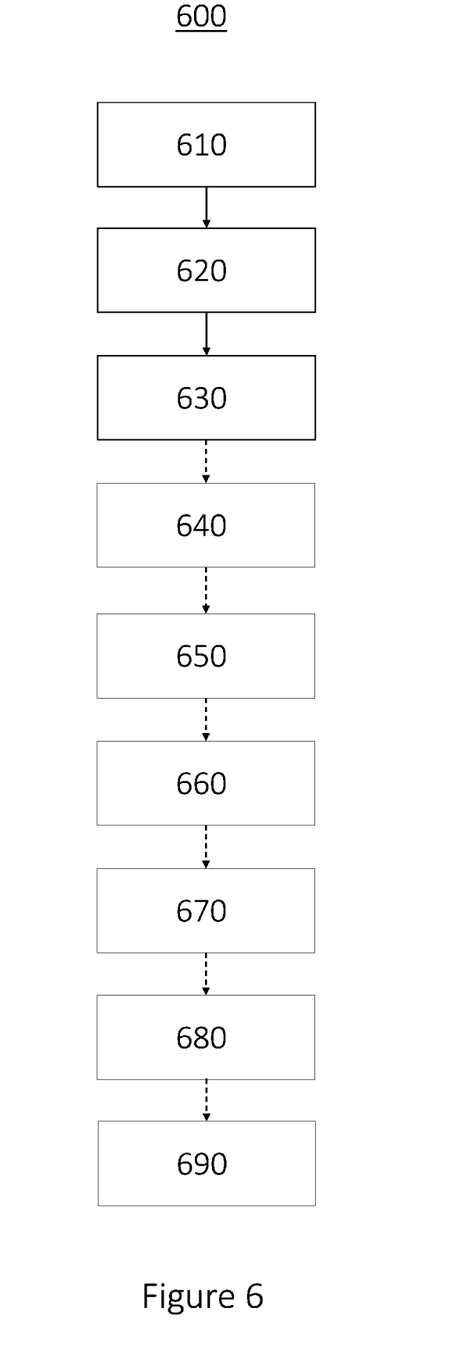
FIG. 6 schematically illustrates a method for monitoring of temperature trends for particles moving along a path of movement from a first position to a second position, in accordance with one or more embodiments described herein.

FIG. 6 schematically illustrates a method 600 for monitoring of temperature trends for particles 160 moving along a path 150 of movement from a first position to a second position, in accordance with one or more embodiments described herein. The method 600 may comprise:

Step 610: detecting a signal related to the temperature of particles 160 moving through a field-of-view of a sensor arrangement 120, said field-of-view being arranged in the path 150 of movement of the particles 160, the sensor arrangement 120 comprising at least one set of sensing elements 140 detecting radiation emitted from the particles 160, each set comprising at least two sensing elements 140 arranged to co-operate with mutually separated sensing zones along the path 150 of movement of the particles 160.

Step 620: forming the signals from the at least one set of sensing elements 140 into at least one pulse train when a particle 160 moves through the field-of-view of the sensor arrangement 120.

Step 630: monitoring changes over time in the temperature of particles 160 moving through the field-of-view of the sensor arrangement 120 based on this at least one pulse train by monitoring changes over time in the wavelength distribution of the radiation emitted from the particles 160.

Use of the method 600 allows for an accurate monitoring of the temperature of particles 160 moving along a path 150 of movement from a first position to a second position The sensor arrangement 120 may comprise first and second sets of sensing elements 140, wherein the first set of sensing elements 140 detects radiation of wavelengths within a first wavelength range, and the second set of sensing elements 140 detects radiation of wavelengths within a second wavelength range, wherein the second wavelength range differs from the first wavelength range. The monitoring 630 may further comprise determining a relation between the signal strengths of the signals detected by the first and second sets of sensing elements 140, and based on this relation monitoring changes over time in the wavelength distribution of the radiation emitted from the particles 160.

The first and second sets of sensing elements 140 may be arranged in first and second sensors 130, which first and second sensors 130 are arranged beside each other and/or in parallel along the path 150 of movement of the particles 160.

Sensing elements from more than one set of sensing elements 140 may be arranged to co-operate with the same sensing zone.

The sensor arrangement 120 may also, or alternatively, comprise first and second wavelength filter arrangements, wherein the first wavelength filter arrangement causes the sensor arrangement 120 to detect radiation of wavelengths within a first wavelength range, and the second wavelength filter arrangement causes the sensor arrangement 120 to detect radiation of wavelengths within a second wavelength range, wherein the second wavelength range differs from the first wavelength range. The monitoring 630 may further comprise determining a relation between the signal strengths of the signals detected by the sensor arrangement 120 through the first and second wavelength filter arrangements, and based on this relation monitor changes over time in the wavelength distribution of the radiation emitted from the particles 160.

The method 600 may further comprise one or more of the following steps:

Step 640: determining the temperature of particles 160 moving through the field-of-view of the sensor arrangement 120.

Step 650: determining how close the temperature of the particles 160 moving through the field-of-view of the sensor arrangement 120 is to the ignition temperature for the particle type.

Step 660: determining the rate of change in the temperature of particles 160 moving through the field-of-view of the sensor arrangement 120.

Step 670: determining whether the temperature of the particles 160 moving through the field-of-view of the sensor arrangement 120 has changed more than a predetermined threshold amount.

Step 680: sending information about temperature trends for the particles 160 moving through the field-of-view of the sensor arrangement 120 to at least one operator, and/or to a control system.

Step 690: monitoring changes over time also in the energy content of the particles 160 moving through the field-of-view of the sensor arrangement 120.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, the sensing elements 140 may be any type of sensing elements that are able to individually detect radiation—any number of sensing elements 140 may e.g. be arranged on the same substrate. In a radiation sensor divided into pixels, a sensing element may e.g. be a group of pixels, or even a single pixel. Accordingly, the scope of the invention is defined only by the claims.

The invention claimed is:

1. A system for monitoring of temperature trends for particles moving along a path of movement from a first position to a second position, the system comprising:
   a sensor arrangement, a field-of-view of which is arranged in the path of movement of the particles to detect a signal related to the temperature of particles moving through said field-of-view, the sensor arrangement comprising at least one set of sensing elements detecting radiation emitted from the particles, each set comprising at least two sensing elements arranged to co-operate with mutually separated sensing zones along the path of movement of the particles; and
   at least one processing device, which is arranged to:
   receive signals from the sensor arrangement;
   form signals from the at least one set of sensing elements into at least one pulse train of signal strengths when a particle moves through the field-of-view of the sensor arrangement; and based on the relation between the signal strengths of this at least one pulse train, monitor changes over time in the temperature of different particles moving through the field-of-view of the sensor arrangement by monitoring changes over time in the wavelength distribution of the radiation emitted from the different particles.

2. The system according to claim 1, wherein the sensor arrangement comprises first and second sets of sensing elements, wherein the first set of sensing elements detects radiation of wavelengths within a first wavelength range, and the second set of sensing elements detects radiation of wavelengths within a second wavelength range, wherein the second wavelength range differs from the first wavelength range, and the at least one processing device is arranged to determine a relation between the signal strengths of the signals detected by the first and second sets of sensing elements, and based on this relation monitor changes over time in the wavelength distribution of the radiation emitted from the particles.

3. The system according to claim 2, wherein the first and second sets of sensing elements are arranged in first and second sensors, which first and second sensors are arranged beside each other and/or in parallel along the path of movement of the particles.

4. The system according to claim 2, wherein sensing elements from more than one set of sensing elements are arranged to co-operate with the same sensing zone.

5. The system according to claim 1, wherein the sensor arrangement comprises first and second wavelength filter arrangements, wherein the first wavelength filter arrangement causes the sensor arrangement to detect radiation of wavelengths within a first wavelength range, and the second wavelength filter arrangement causes the sensor arrangement to detect radiation of wavelengths within a second wavelength range, wherein the second wavelength range differs from the first wavelength range, and the at least one processing device is arranged to determine a relation between the signal strengths of the signals detected by the sensor arrangement through the first and second wavelength filter arrangements, and based on this relation monitor changes over time in the wavelength distribution of the radiation emitted from the particles.

6. The system according to claim 1, wherein the at least one processing device is further arranged to determine the temperature of particles moving through the field-of-view of the sensor arrangement.

7. The system according to claim 6, wherein the at least one processing device is arranged to determine how close the temperature of the particles moving through the field-of-view of the sensor arrangement is to the ignition temperature for the particle type of the particles moving along the path of movement from the first position to the second position.

8. The system according to claim 1, wherein the at least one processing device is arranged to determine the rate of change in the temperature of particles moving through the field-of-view of the sensor arrangement.

9. The system according to claim 1, wherein the at least one processing device is arranged to determine whether the temperature of the particles moving through the field-of-view of the sensor arrangement has changed more than a predetermined threshold amount.

10. The system according to claim 1, wherein the at least one processing device is arranged to send information about temperature trends for the particles moving through the field-of-view of the sensor arrangement to at least one operator, and/or to a control system.

11. The system according to claim 1, wherein the at least one processing device is arranged to monitor changes over time also in the energy content of the particles moving through the field-of-view of the sensor arrangement.

12. A method comprising:
detecting a signal related to a temperature of particles moving through a field-of-view of a sensor arrangement, said field-of-view being arranged in a path of movement of the particles from a first position to a second position, the sensor arrangement comprising at least one set of sensing elements detecting radiation emitted from the particles, each set comprising at least two sensing elements arranged to co-operate with mutually separated sensing zones along the path of movement of the particles;
forming the signals from the at least one set of sensing elements into at least one pulse train of signal strengths when a particle moves through the field-of-view of the sensor arrangement; and
monitoring changes over time in the temperature of different particles moving through the field-of-view of the sensor arrangement by monitoring changes over time in the wavelength distribution of the radiation emitted from the different particles based on the relation between the signal strengths of this at least one pulse train.

13. The method according to claim 12, wherein the sensor arrangement comprises first and second sets of sensing elements, wherein the first set of sensing elements detects radiation of wavelengths within a first wavelength range, and the second set of sensing elements detects radiation of wavelengths within a second wavelength range, wherein the second wavelength range differs from the first wavelength range, wherein the monitoring further comprises determining a relation between the signal strengths of the signals detected by the first and second sets of sensing elements, and based on this relation monitoring changes over time in the wavelength distribution of the radiation emitted from the particles.

14. The method according to claim 13, wherein the first and second sets of sensing elements are arranged in first and second sensors, which first and second sensors are arranged beside each other and/or in parallel along the path of movement of the particles.

15. The method according to claim 12, wherein sensing elements from more than one set of sensing elements are arranged to co-operate with the same sensing zone.

16. The method according to claim 12, wherein the sensor arrangement comprises first and second filter arrangements, wherein the first filter arrangement causes the sensor arrangement to detect radiation of wavelengths within a first wavelength range, and the second filter arrangement causes the sensor arrangement to detect radiation of wavelengths within a second wavelength range, wherein the second wavelength range differs from the first wavelength range, wherein the monitoring further comprises determining a relation between the signal strengths of the signals detected by the sensor arrangement through the first and second filter arrangements, and based on this relation monitor changes over time in the wavelength distribution of the radiation emitted from the particles.

17. The method according to claim 12, further comprising determining the temperature of particles moving through the field-of-view of the sensor arrangement.

18. The method according to claim 17, further comprising determining how close the temperature of the particles moving through the field-of-view of the sensor arrangement is to the ignition temperature for the particle type of the particles moving along the path of movement from the first position to the second position.

19. The method according to claim 12, further comprising determining the rate of change in the temperature of particles moving through the field-of-view of the sensor arrangement.

20. The method according to claim 12, further comprising determining whether the temperature of the particles moving through the field-of-view of the sensor arrangement has changed more than a predetermined threshold amount.

21. The method according to claim 12, further comprising sending information about temperature trends for the particles moving through the field-of-view of the sensor arrangement to at least one operator, and/or to a control system.

22. The method according to claim 12, further comprising monitoring changes over time also in the energy content of the particles moving through the field-of-view of the sensor arrangement.

* * * * *